(12) United States Patent
Youn et al.

(10) Patent No.: US 8,443,111 B2
(45) Date of Patent: May 14, 2013

(54) COMMUNICATION METHOD TO TRANSFER USER OPERATION INFORMATION BETWEEN ELECTRONIC DEVICE AND HOST DEVICE AND ELECTRONIC DEVICE USING THE SAME

(75) Inventors: Joon-ho Youn, Suwon-si (KR); Joong-hoon Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 87 days.

(21) Appl. No.: 12/689,348

(22) Filed: Jan. 19, 2010

(65) Prior Publication Data
US 2010/0274931 A1    Oct. 28, 2010

(30) Foreign Application Priority Data
Apr. 28, 2009  (KR) .................. 10-2009-0037348

(51) Int. Cl.
*G06F 3/00*    (2006.01)

(52) U.S. Cl.
USPC .................................... 710/5; 710/2

(58) Field of Classification Search ............. None
See application file for complete search history.

(56) References Cited

U.S. PATENT DOCUMENTS

| | | | |
|---|---|---|---|
| 7,936,474 B2* | 5/2011 | Ono | 358/1.15 |
| 2009/0172129 A1* | 7/2009 | Singh et al. | 709/217 |

* cited by examiner

*Primary Examiner* — Idriss N Alrobaye
*Assistant Examiner* — Richard B Franklin
(74) *Attorney, Agent, or Firm* — Stanzione & Kim, LLP (57) ABSTRACT

A communication method to transfer user operation information includes, if a user's operation is input through the electronic device, and if the electronic device then receives a command from a host device while the electronic device is connected to the host device, transmitting information to the host device notify the host device of the user's operation. Therefore, it is possible for a user to command the host device to perform a frequently used function through a simple operation of the electronic device, without a need to be aware of the complex usage of an application.

14 Claims, 10 Drawing Sheets

| Byte \ Bit | 7 | 6 | 5 | 4 | 3 | 2 | 1 | 0 |
|---|---|---|---|---|---|---|---|---|
| 0 | OPERATION CODE ||||||||
| 1 | Reserved ||||||||
| 2 | Reserved ||||||||
| 3 | Reserved ||||||||
| 4 | Reserved ||||||||
| 5 | Vendor Specific || Reserved ||| CRN | NACA | Obsolete | LINK |

FIG. 5

| Sense Key | Description | Sense Key | Description | Sense Key | Description | Sense Key | Description |
|---|---|---|---|---|---|---|---|
| 0 | NO SENSE | 4 | HARDWARE ERROR | 8 | BLANK CHECK | C | OBSOLUTE |
| 1 | RECOVERED ERROR | 5 | ILLEGAL REQUEST | 9 | VENDOR-SPECIFIC | D | VOLUME OVERFLOW |
| 2 | NOT READY | 6 | UNIT ATTENTION | A | COPY ABORTED | E | MISCOMPARE |
| 3 | MEDIUM ERROR | 7 | DATA PROTECT | B | ABORTED COMMAND | F | RESERVED |

Detailed information input

Title :

Description :

Tags :

COMMUNICATION METHOD TO TRANSFER USER OPERATION INFORMATION BETWEEN ELECTRONIC DEVICE AND HOST DEVICE AND ELECTRONIC DEVICE USING THE SAME

CROSS-REFERENCE TO RELATED APPLICATIONS

This application claims priority under 35 U.S.C. §119 (a) from Korean Patent Application No. 10-2009-0037348, filed on Apr. 28, 2009, in the Korean Intellectual Property Office, the disclosure of which is incorporated herein by reference in its entirety.

BACKGROUND

1. Field of the Invention

The present general inventive concept relates to an electronic device, and more particularly, to an electronic device connected to a host device in order to transfer information to the host device.

2. Description of the Related Art

The present general inventive concept relates to an electronic device, and more particularly, to an electronic device connected to a host device in order to transfer information to the host device.

2. Description of the Related Art

Electronic devices are connected to host devices to send information stored therein to host devices, or to receive information stored in host devices. To send or receive information, electronic devices are connected to host devices via universal serial buses (USB), and widely used as portable storage media of host devices.

Electronic devices capable of sending or receiving information to or from host devices are typically operated according to the bulk-only-transport specification. In this situation, it is impossible for users to enter operation commands using electronic devices connected to host devices. In other words, users may enter operation commands using host devices only.

In the case when a predetermined application needs to be installed in order to use an electronic device connected to a host device, the installed application needs to be launched to perform required user's operations. However, when the application is too complex to use, users need to recognize the complex usage of the application in order to easily perform user's operations, which causes inconvenience to users.

SUMMARY

The present general inventive concept provides an electronic device capable of receiving a user operation and transferring information regarding the user operation to a host device even when connected to the host device, and a communication method of the electronic device.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method to automatically upload audio or video data to a website, the method including selecting predetermined audio or video data from among audio or video data recorded in a recording medium, allowing the recording medium to be connected to a network communication device via a universal serial bus (USB), receiving input of a user when the recording medium is being connected to the network communication device, and automatically uploading the selected audio or video data to a predetermined website according to the input of the user.

An address for the predetermined website may be stored in the recording medium.

The address for the predetermined website may be stored in the network communication device.

The method may further include recording information regarding a data route of the selected audio or video data on a predetermined file.

The method may further include uploading the selected audio or video data to the predetermined website, and then automatically deleting the selection of the audio or video data.

The method may further include transmitting information regarding a status of the recording medium to the network communication device when the input of the user is received, receiving request information on a cause of the status from the network communication device, and sending response information in response to the received request information.

The foregoing and/or other aspects and utilities of the present general inventive concept may be achieved by providing a method to automatically upload audio or video data to a website, the method including allowing a recording medium to be connected to a network communication device via a universal serial bus (USB), receiving a website upload command from the recording medium, reading information regarding a route of audio or video data to be uploaded to a predetermined website from audio or video data recorded in the recording medium, and reading the audio or video data to be uploaded to the predetermined website based on the read information and automatically uploading the read audio or video data to the predetermined website.

The foregoing and/or other aspects and utilities of the present general inventive concept may be achieved by providing a method by which an electronic device communicates with a host device, the method including determining whether or not a user's operation is input when the electronic device is being connected to the host device, determining whether or not a command is received from the host device if it is determined that the user's operation is input, and transmitting information to notify of the user's operation to the host device if it is determined that the command is received.

The transmitting of the information to notify of the user's operation may include transmitting the information to notify of the user's operation to the host device, not performing a function specified by the command, if it is determined that the command is received.

The transmitting of the information to notify of the user's operation may include transmitting to the host a message stating that the function specified by the command is not performed, if it is determined that the command is received, and transmitting the information to notify of the user's operation to the host device, if an inquiry about non-performance of the function specified by the command is received.

The user's operation may be a command for an operation which needs to be performed by the host device.

The operation which needs to be performed by the host device may include reading content stored in the electronic device and uploading the read content onto the Internet.

The electronic device may be operated according to a bulk-only transport specification.

The function specified by the command may be performed by the host device, and the command may be generated by software used to manage the electronic device.

The transmitting of the information to notify of the user's operation may include transmitting the information to notify of the user's operation to the host device, not performing the function specified by the command even when the electronic device is capable of performing the function, if it is determined that the command is received.

The user's operation may be an operation of pressing a button included on the electronic device, and the information to notify of the user's operation may be information to notify of a button pressed by a user.

The foregoing and/or other aspects and utilities of the present general inventive concept may be achieved by providing an electronic device including a communication interface which is communicably connected to a host device, an operating unit to receive input of a user's operation, and a controller to transmit information to notify of the user's operation to the host device via the communication interface, if a command is received from the host device via the communication interface after the user's operation is received through the operating unit when the electronic device is being connected to the host device via the communication interface.

The foregoing and/or other aspects and utilities of the present general inventive concept may be achieved by providing a method by which a host device communicates with an electronic device, the method including transmitting a command to the electronic device connected to the host device, and performing a function specified by information regarding a user operation input through the electronic device, if the information regarding the user's operation is received from the electronic device after transmitting the command.

Features and/or utilities of the present general inventive concept may also be realized by a method of uploading data to a website, the method including connecting a data storage device to a host computing device and automatically transmitting data from the data storage device to a website via the host computing device.

The transmitted data may not be permanently stored on the host computing device.

The computing device may receive no direct user input between a time at which the storage device is connected to the computing device and a time at which the computing device uploads the data to the website.

The computing device may receive a user input before automatically transmitting data from the data storage device to the website.

Website address information may be stored in the data storage device and transmitted to the host computing device to transmit the data to the website via the host device.

The data storage device may be wirelessly connected to the host computing device.

The data storage device may be connected to the host computing device via a video-transmission cable.

The method may further include, when the data storage device is connected to the computing unit, detecting whether a data upload button is pressed on the data storage device and automatically transmitting data from the data storage device to a website only when the data upload button is pressed.

The data may be user-created content, and the user-created content may be video.

The data storage device may be a digital video recorder.

Features and/or utilities of the present general inventive concept may also be realized by a method of transmitting data to a website via a computing unit, the method including connecting to an external data storage device, receiving data from the data storage device, and automatically transmitting the data from the data storage device to a website via the computing unit.

The computing unit may be connected to the Internet, and the website may be accessible via the Internet.

Features and/or utilities of the present general inventive concept may also be realized by a method of transmitting data to a website, the method including connecting an external storage device to a computing device, transmitting data to the computing device, and communicating with the computing device to automatically transmit the data from the data storage device to a website via the computing device.

Features and/or utilities of the present general inventive concept may also be realized by a computer-readable medium having stored thereon code to control a computing device to perform a method, the method including connecting to a data storage device, receiving data from the data storage device, and automatically transmitting the data from the data storage device to a website.

Features and/or utilities of the present general inventive concept may also be realized by a computer-readable medium having stored thereon code to control a data storage device to perform a method, the method including connecting to a computing device, transmitting data to the computing device, and communicating with the computing device to automatically transmit the data from the data storage device to a website via the computing device.

Features and/or utilities of the present general inventive concept may also be realized by a method of communicating with a computing device, the method including connecting an external storage unit to a computing device, detecting whether an operation key of the external storage unit is pressed when the external storage unit is connected to the computing device, and automatically performing on the computing device the operation indicated by the operation key on the external storage device.

The method may further include detecting a command from the computing device to the external storage unit and if the operation indicated by the operation key of the external storage device is not completed, transmitting a "failure" message to the computing device corresponding to the command from the computing device.

The method may further include, after transmitting the "failure" message, completing the operation indicated by the operation key, and after completing the operation indicated by the operation key, executing the command from the computing device on the external storage unit.

Features and/or utilities of the present general inventive concept may also be realized by a method of performing an operation on a computing device, the method including controlling an external device to transmit an operation command, connecting the external device to a computing device, and automatically performing an operation on the computing device corresponding to the operation command.

The method may further include detecting a command from the computing device, and, if the operation indicated by the operation command of the external storage device is not completed, transmitting a "failure" message to the computing device corresponding to the command from the computing device.

The computing device may include an operating system and an application to operate the external device, and the method may further include transmitting the "failure" message to the computing device only if the command from the computing device corresponds to the application.

The method may further include executing the command from the computing device before completing the operation indicated by the operation command of the external device when the command from the computing device is from the operating system.

BRIEF DESCRIPTION OF THE DRAWINGS

Embodiments of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
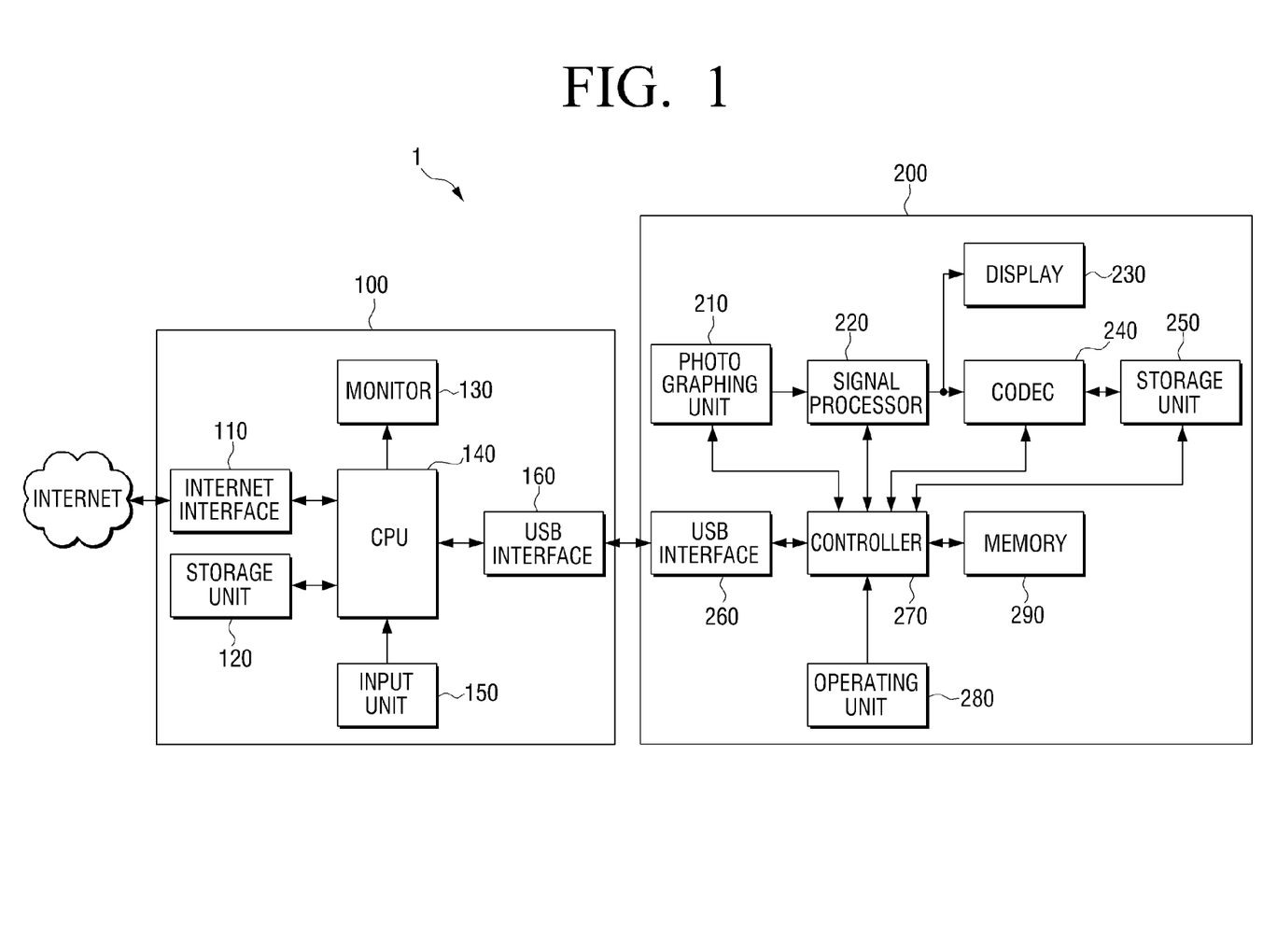
FIG. 1 illustrates a block diagram of a user created content (UCC) upload system according to an exemplary embodiment of the present general inventive concept.

FIG. 1 illustrates a block diagram of a user created content (UCC) upload system 1 according to an exemplary embodiment of the present general inventive concept. A user-created content upload system may be used to upload user-created content desired by a user to a website. The user-created content upload system 1, shown in FIG. 1, is configured in such a manner that a personal computer (PC) 100 is connected to a digital camcorder 200, enabling mutual communication.

The PC 100 can read user-created content selected by the user from among user-created content stored in the digital camcorder 200, and can upload the read user-created content to a website on the Internet. The PC 100 may include an Internet interface 110, a storage unit 120, a monitor 130, a central processing unit (CPU) 140, an input unit 150 and a universal serial bus (USB) interface 160, as illustrated in FIG. 1.

The Internet interface 110 is communicably connected to the Internet. The storage unit 120 can store a program processed by the CPU 140 and data required to process the program. The storage unit 120 may include a read-only memory (ROM), a random-access memory (RAM), and a hard disk drive (HDD). The monitor 130 can visually provide a result obtained by processing user commands. The input unit 150 can receive user commands input by a user, and may include a keyboard and a mouse.

The USB interface 160 is communicably connected to the digital camcorder 200 in USB mode. The CPU 140 can control the Internet interface 110, the storage unit 120, the monitor 130 and the USB interface 160, in order to perform operations according to user commands received through the input unit 150.

The CPU 140 can perform various processes required to upload user-created content stored in the digital camcorder 200 connected via the USB interface 160 to a predetermined website over the Internet connected to the Internet interface 110. These processes will be described in detail below.

The digital camcorder 200 can store user-created content photographed by a user and can play back the stored user-created content. The digital camcorder 200 may be operated according to the bulk-only transport specification. The digital camcorder 200 may include a photographing unit 210, a signal processor 220, a display 230, a CODEC 240, a storage unit 250, an USB interface 260, a controller 270, an operating unit 280 and a memory 290.

The photographing unit 210 can convert an image of an object for photography, which is input through a lens and formed on an optical plane of an image pickup device, into a video signal. The signal processor 220 can perform signal processing on the video signal output from the photographing unit 210. The CODEC 240 can compress the video signal processed by the signal processor 220 into a predetermined compression format, to generate a video file. The storage unit 250 can store the video file generated by the CODEC 240 in a recording medium.

Additionally, the storage unit 250 can read a video file recorded in the recording medium, and can transfer the read video file to the CODEC 240. After receiving the video file from the storage unit 250, the CODEC 240 can decompress the received video file, to generate a video signal.

The display 230 can display a video corresponding to the video signal, which is generated by the photographing unit 210 and processed by the signal processor 220. Additionally, the display 230 can display a video corresponding to the video file, which is read by the storage unit 250 and decompressed by the CODEC 240.

The memory 290 refers to a medium to store a program processed by the controller 270 and data required to process the program. The operating unit 280 can receive user commands, and may include a physical button included on a case of the digital camcorder 200.

The USB interface 260 is communicably connected to the PC 100 in USB mode. The controller 270 can control the photographing unit 210, the signal processor 220, the CODEC 240, the storage unit 250 and the USB interface 260, in order to perform operations according to user commands receive through the operating unit 280.

Additionally, the controller 270 can perform various processes required to upload video files stored in the storage unit 250 as user-created content to a website through the PC 100, when the digital camcorder 200 is being connected to the PC 100 via the USB interface 260.

Hereinafter, a process of uploading video files photographed by a user to a website as user-created content in the user-created content upload system illustrated in FIG. 1 is described in detail.

First, an architecture of software executed by the CPU 140 of the PC 100 and an architecture of software executed by the controller 270 of the digital camcorder 200 are now described in detail with reference to FIG. 2.

Figure 2:
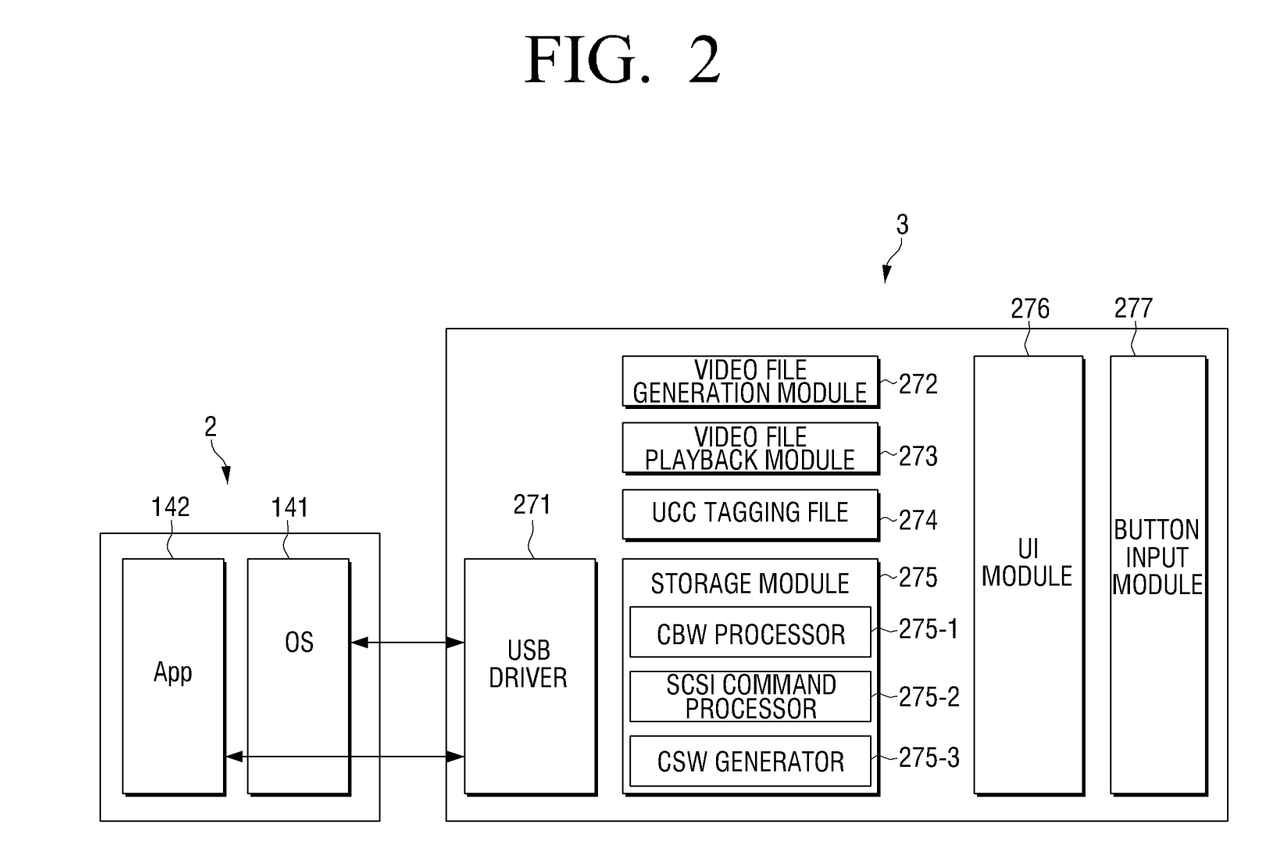
FIG. 2 illustrates a block diagram of architectures of software in the user-created content upload system illustrated in FIG. 1.

As illustrated in FIG. 2, the software 2 executed by the CPU 140 of the PC 100 may include an operating system (OS) 141 and an application (App) 142. The OS 141 is software required to perform basic operations of the PC 100, and the App 142 is software required to manage the digital camcorder 200 through the PC 100.

The App 142 can display on the monitor 130 video files stored in the storage unit 250 of the digital camcorder 200, can store the video files in the storage unit 120 of the PC 100, and can upload the video files to a website as user-created content.

In FIG. 2, the software 3 executed by the controller 270 of the digital camcorder 200 may include an USB driver 271, a video file generation module 272, a video file playback module 273, a user-created content tagging file 274, a storage module 275, a user interface (UI) module 276, and a button input module 277.

The video file generation module 272 can perform an operation to allow the video file, which is compressed by the CODEC 240 through the photographing unit 210 and the signal processor 220, to be stored in the storage unit 250.

The video file playback module 273 can perform an operation to allow the video file stored in the storage unit 250 to be decompressed by the CODEC 240 and played back by the display 230.

The USB driver 271 can function to set, maintain and disconnect the USB connection between the PC 100 and the digital camcorder 200.

The storage module 275 refers to software to perform functions required to enable the digital camcorder 200 to function as a portable storage medium of the PC 100 when the digital camcorder 200 is connected to the PC 100. The storage module 275 may include a command block wrapper (CBW) processor 275-1, a small computer system interface (SCSI) command processor 275-2, and a command status wrapper (CSW) generator 275-3.

The CBW processor 275-1 can extract an SCSI command from a CBW received from the PC 100.

The SCSI command processor 275-2 can perform a function specified by the SCSI command extracted by the CBW processor 275-1. The SCSI command may be generated by the OS 141 or App 142 of the PC 100.

The CSW generator 275-3 can generate a CSW on which the SCSI command processing result obtained by the SCSI command processor 275-2 is recorded, and can transfer the generated CSW to the PC 100. In this situation, 1) if the SCSI command is generated by the OS 141 of the PC 100, the CSW generator 275-3 may transfer the SCSI command processing result to the OS 141 of the PC 100, or alternatively, 2) if the SCSI command is generated by the App 142 of the PC 100, the CSW generator 275-3 may transfer the SCSI command processing result to the App 142 of the PC 100.

The button input module 277 refers to software used to detect whether or not a user presses a button included on the operating unit 280. The button input module 277 can transfer the result of detection to the UI module 276.

The UI module 276 can perform a function corresponding to the button detected by the button input module 277. Additionally, if a single button is capable of control multiple functions, the UI module 276 can determine which function needs to be performed among the multiple functions.

The user-created content tagging file 274 is a file containing routes where user-created content to be uploaded to a website is stored. The user-created content tagging file 274 may be generated by the UI module 276.

Figure 3:
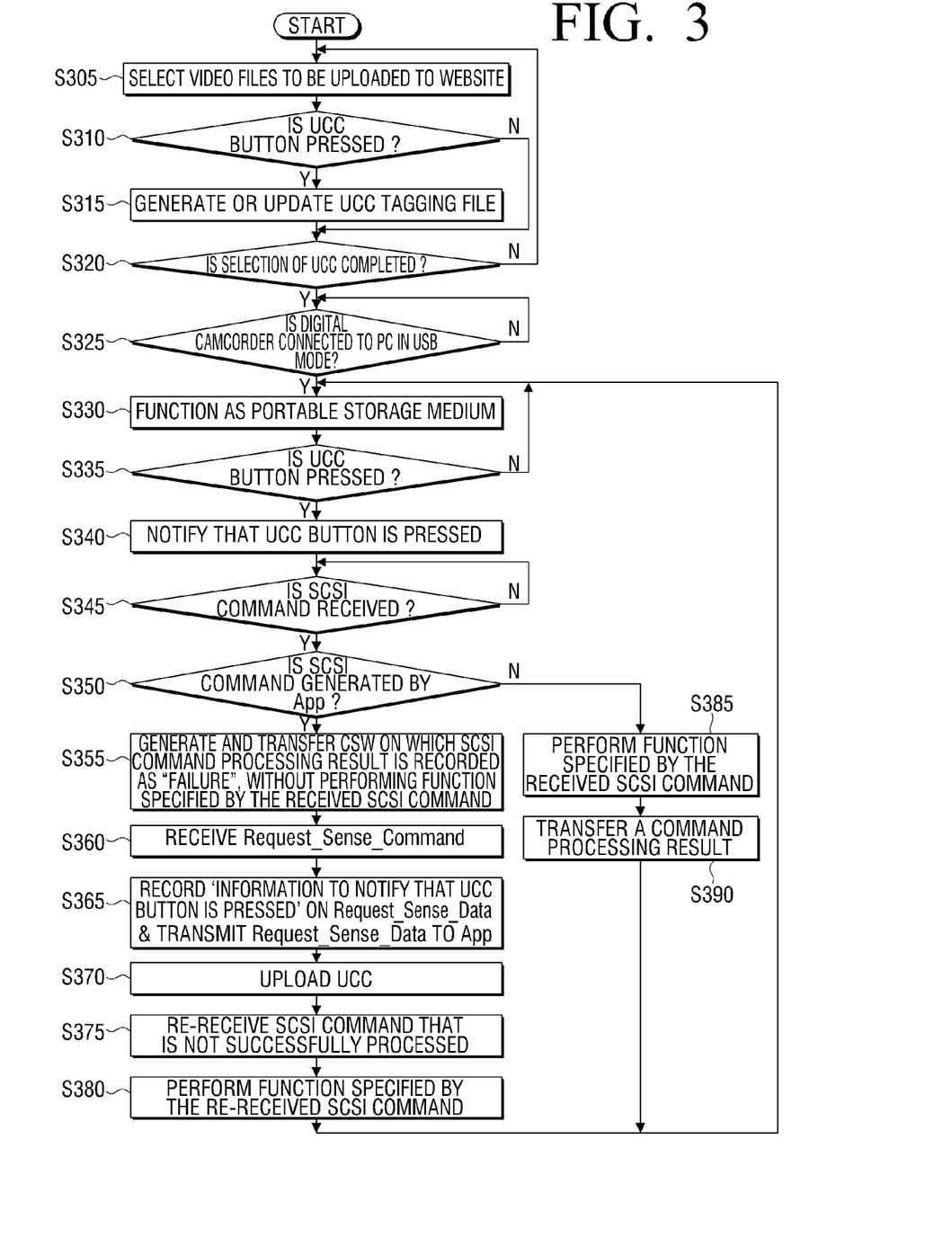
FIG. 3 is a flowchart illustrating a process of uploading to a website a video file photographed by a user as user-created content in the user-created content upload system illustrated in FIG. 1.

Hereinafter, a process of uploading video files photographed by a user to a website as user-created content in the user-created content upload system is described with reference to the architectures of software illustrated in FIG. 2 and a flowchart illustrated in FIG. 3.

First, a user may select user-created content, which he or she desires to upload to a website, using the digital camcorder 200 in operations S305 to 320.

In more detail, if the user selects a video file that he or she desires to upload to a website from among video files arranged in a video file list displayed on the display 230 of the digital camcorder 200 in operation S305, and then presses an user-created content button included on the operating unit 280 in operation S310-Y, the controller 270 can generate an user-created content tagging file in operation S315.

In operation S310, the button input module 277 currently executed by the controller 270 may detect whether or not the user presses the user-created content button. In operation S315, the user-created content tagging file may be generated by the UI module 276 when the button input module 277 notifies the UI module 276 that the user-created content button is pressed.

Subsequently, if the user continues to select user-created content in operation S320-N, operations S305 to 320 may be repeated. In this situation, the user-created content tagging file may be updated in operation S315.

If selection of user-created content to be uploaded is completed in operation S320-Y, and if the digital camcorder 200 is connected to the PC 100 in the USB mode in operation S325-Y, the storage module 275 currently executed by the controller 270 may enable the digital camcorder 200 to function as a portable storage medium of the PC 100 in operation S330.

During operation S330, the button input module 277 may detect whether or not the user presses the user-created content button on the operating unit 280 in operation S335.

If it is detected that the user presses the user-created content button in operation S335-Y, the button input module 277 may provide the UI module 276 with notification that the user-created content button is pressed, and the UI module 276 may transfer the received notification to the storage module 275 in operation S340.

After receiving the notification that the user-created content button is pressed, the SCSI command processor 275-2 of the storage module 275 may determine whether or not the SCSI command is received from the PC 100 in operation S345. If it is determined that the SCSI command is received in operation S345-Y, the SCSI command processor 275-2 may determine whether or not the received SCSI command is generated by the App 142 of the PC 100 in operation S350.

Figure 4:
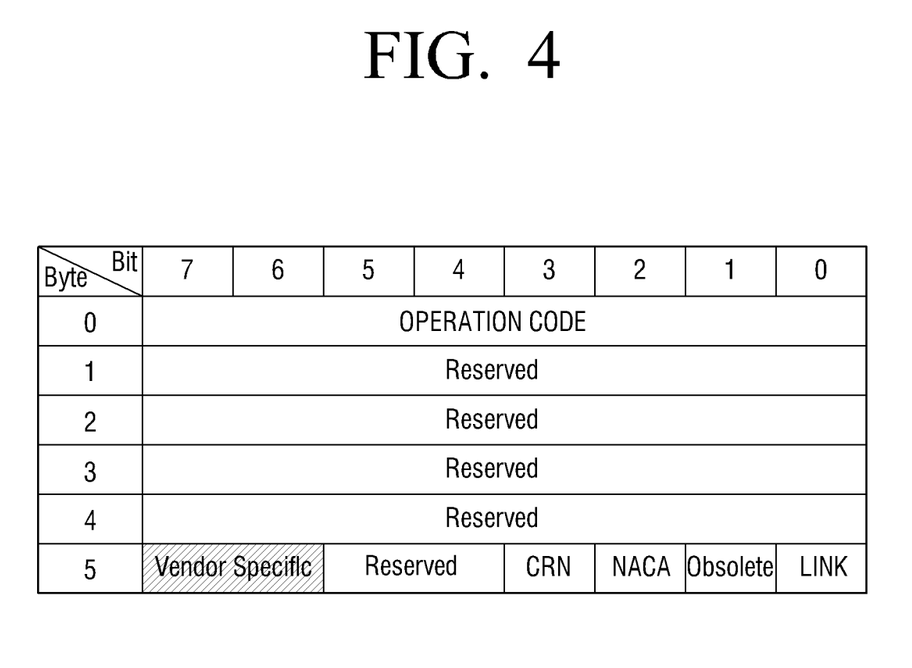
FIG. 4 exemplarily illustrates a structure of a "TEST UNIT READY" SCSI command.

FIG. 4 exemplarily illustrates a structure of a "TEST UNIT READY" SCSI command which is a kind of SCSI command. In FIG. 4, a Vendor Specific field is located on a sixth bit and seventh bit of a fifth byte in the "TEST UNIT READY" SCSI command.

In the exemplary embodiment of the present general inventive concept, the App 142 may record its own ID on the Vendor Specific field during generating an SCSI command. For example, during generating an SCSI command, the App 142 may record '11' as its own ID on the Vendor Specific field.

Accordingly, the SCSI command processor 275-2 can determine which software is used to generate an SCSI command, by checking information recorded on the Vendor Specific field.

Referring back to FIG. 2, if it is determined that the received SCSI command is not generated by the App 142 of the PC 100 (that is, if it is determined that the received SCSI command is generated by the OS 141 of the PC 100) in operation S350-N, the SCSI command processor 275-2 may perform a function specified by the received SCSI command in operation S385. Additionally, the CSW generator 275-3 may generate a CSW on which the SCSI command processing result is recorded, and may transfer the generated CSW to the OS 141 of the PC 100 in operation S390.

On the other hand, if it is determined that the received SCSI command is generated by the App 142 of the PC 100 in operation S350-Y, the SCSI command processor 275-2 may not perform the function specified by the received SCSI command, and the CSW generator 275-3 may generate a CSW on which the SCSI command processing result is recorded as "Failure", and may transfer the generated CSW to the App 142 of the PC 100 in operation S355.

After receiving the CSW generated in operation S355, the App 142 of the PC 100 may transmit a Request_Sense_Command to the SCSI command processor 275-2.

The SCSI command processor 275-2 may receive the Request_Sense_Command from the App 142 of the PC 100 in operation S360. In response to the Request_Sense_Command, the SCSI command processor 275-2 may record 'information to notify that the user-created content button is pressed' on Request_Sense_Data, and may transmit the Request_Sense_Data to the App 142 of the PC 100 in operation S365.

In operation S365, the SCSI command processor 275-2 may use a sense key and sense code contained in the Request_Sense_Data to record the 'information to notify that the user-created content button is pressed'.

Figure 5:
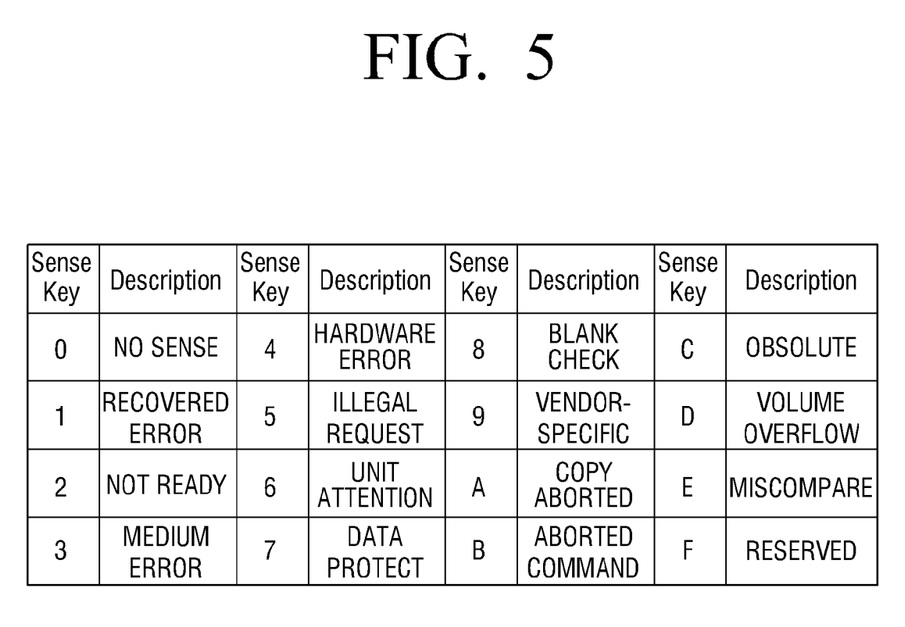
FIG. 5 exemplarily illustrates information contained in a sense key.

Information contained in the sense key is described as illustrated in FIG. 5. In order to transmit the 'information to notify that the user-created content button is pressed', the sense key may be set to be '9' (namely, VENDOR SPECIFIC). Additionally, the sense code corresponding to 1 byte contains information required to distinguish a pressed button from other buttons. Accordingly, in the present general inventive concept, the sense code can contain information required to distinguish the pressed user-created content button from other buttons.

After receiving the Request_Sense_Data from the SCSI command processor 275-2 in operation S365, the App 142 of the PC 100 may recognize that the user-created content button on the operating unit 280 of the digital camcorder 200 is pressed, based on the information contained in the received Request_Sense_Data.

Subsequently, the App 142 of the PC 100 may read video files to be uploaded from the storage unit 250 based on the user-created content tagging file 274, and may then upload the read video files as user-created content to a website on the Internet through the Internet interface 110 in operation S370. After operation S370 is completely performed, the UI module 276 may delete the user-created content tagging file 274.

The App 142 of the PC 100 may then re-send the SCSI command that is not successfully processed in operation S355, and the SCSI command processor 275-2 may re-receive the SCSI command from the App 142 in operation S375. The SCSI command processor 275-2 may then perform the function specified by the re-received SCSI command, and the CSW generator 275-3 may generate a CSW on which the SCSI command processing result is recorded, and may transfer the generated CSW to the App 142 of the PC 100 in operation S380.

Figure 6:
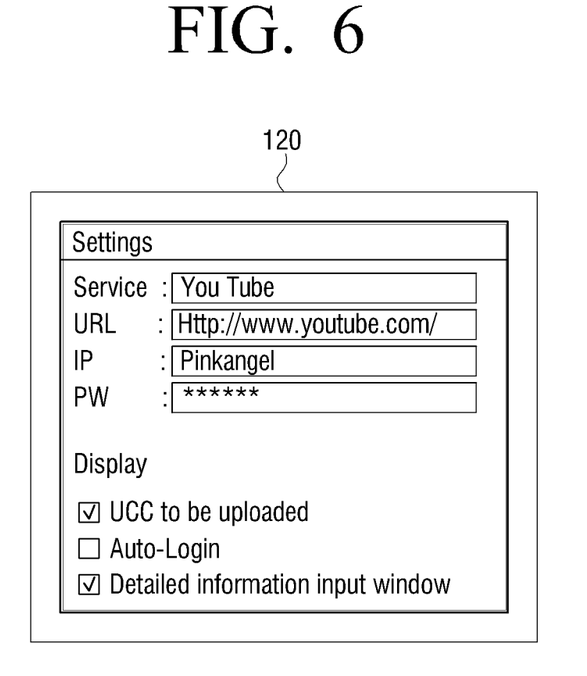
FIGS. 6 to 8 exemplarily illustrate graphical user interface (GUI) screens used to set a configuration to upload user-created content.

FIG. 6 exemplarily illustrates a graphical user interface (GUI) screen to set a configuration to upload user-created content. User-created content may be uploaded according to settings displayed on the GUI screen of FIG. 6.

As illustrated in FIG. 6, a website to which user-created content is to be uploaded is YouTube®, and a box for displaying a window with the user-created content to be uploaded and a box for displaying a detailed information input window are checked. Information regarding a uniform resource locator (URL) set through the GUI screen illustrated in FIG. 6 may be stored in at least one of the storage unit 120 of the PC 100 and the storage unit 250 of the digital camcorder 200, and may be used.

Figure 7:
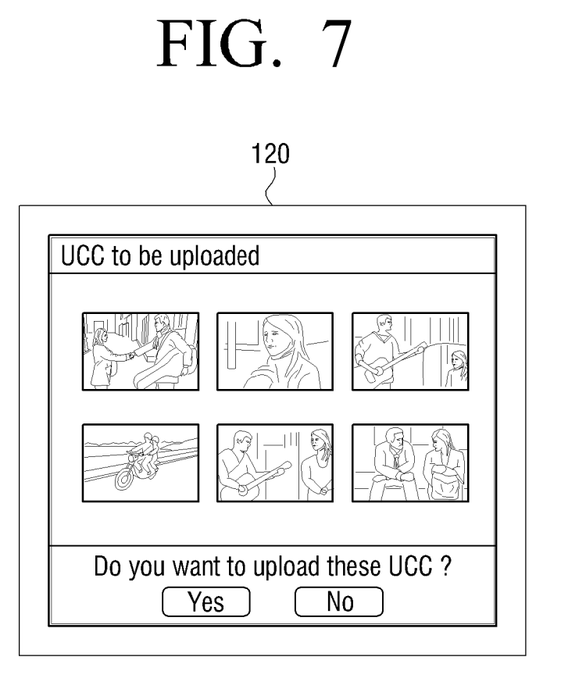
Figure 8:
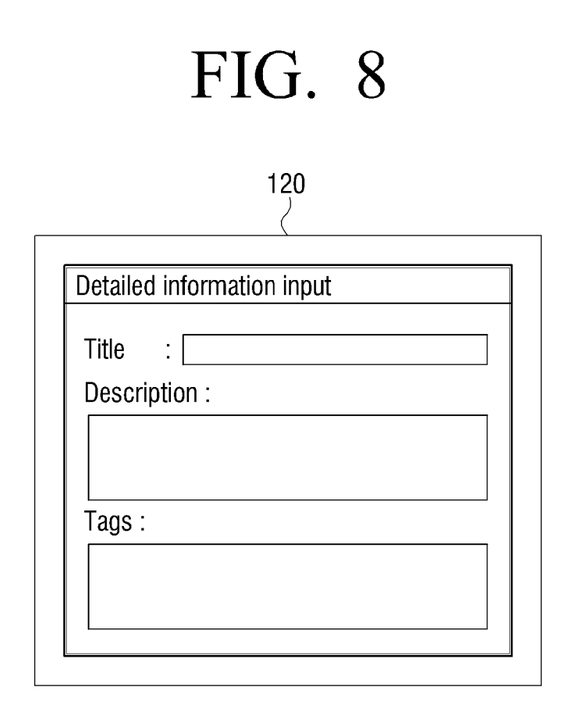

According to settings displayed on the GUI screen of FIG. 6, images representing the user-created content to be uploaded are displayed, so that a user can finally confirm video files to be uploaded as user-created content before uploading the video files, as illustrated in FIG. 7. Additionally, the detailed information input window is displayed, so that a user can enter information about user-created content to be uploaded, including title, description and tags of user-created content to be uploaded, prior to uploading user-created content, as illustrated in FIG. 8.

The process of uploading the video files photographed by the user to the website as user-created content in the user-created content upload system illustrated in FIG. 1 has been described in detail with reference to the exemplary embodiments of the present general inventive concept.

The digital camcorder 200 and the PC 100 are exemplarily described as an electronic device and a host device, respectively, in the exemplary embodiment of the present general inventive concept. Accordingly, the digital camcorder 200 and the PC 100 may be replaced with other devices. For example, the digital camcorder 200 may be replaced with an MPEG Audio Layer 3 (MP3) player, an electronic dictionary, a digital camera or a mobile phone.

Additionally, the user-created content button is merely exemplary for convenience of description, and thus the present general inventive concept is also applicable to buttons other than the user-created content button. Furthermore, only a single button is capable of being operated by the user when the digital camcorder 200 is connected to the PC 100 in the exemplary embodiment of the present general inventive concept, but there is no limitation to the number of buttons capable of being operated by the user. Accordingly, two or more buttons are capable of being operated by the user. However, two or more buttons may be used on the assumption that information contained in the sense code may be set for each button.

Moreover, the user's button operation is merely exemplified as user's operation using a physical user interface (PUI). Accordingly, the present general inventive concept is also applicable to user's operations using PUIs other than the button, and to user's operations using a GUI. In other words, there is no limitation to user's operations.

In addition, uploading of user-created content according to the user command input through the user-created content button operation is merely exemplified as a function performed by the PC 100 as a host. Accordingly, the present general inventive concept is equally applicable to a situation in which operations other than the uploading of user-created content are performed when the user-created content button operation is input.

The digital camcorder 200 and the PC 100 are connected in the USB mode in the exemplary embodiment of the present general inventive concept, but this is merely exemplary. Accordingly, the present general inventive concept is also applicable to connection modes other than the USB mode to connect the digital camcorder 200 and the PC 100.

Additionally, there is no limitation to subject for user-created content. In other words, not only video such as a moving image or a still image, but also audio may be used as user-created content.

Furthermore, a host device to which an electronic device is connected may be any network communication device capable of accessing the Internet. Additionally, the electronic device may be any device capable of functioning as a portable storage medium or data storage device of the host device.

Figure 9:
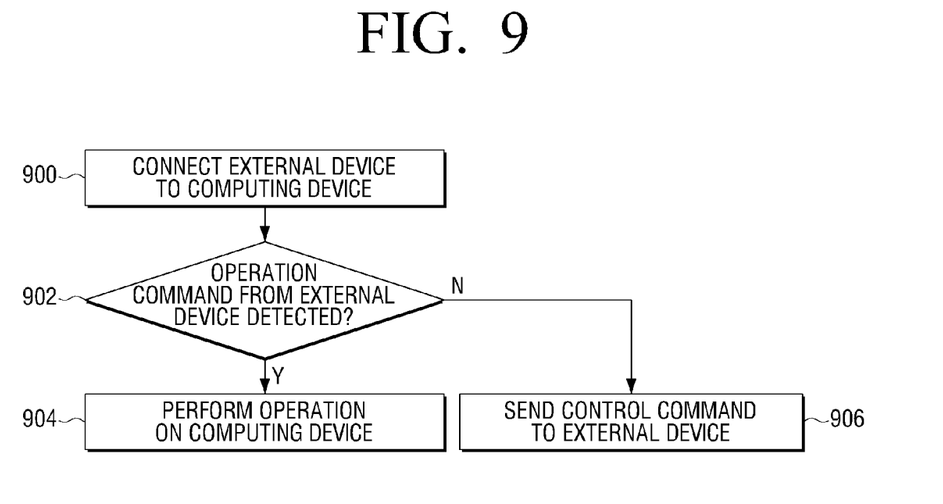
FIG. 9 is a flowchart illustrating operation of a host device.
Figure 10:
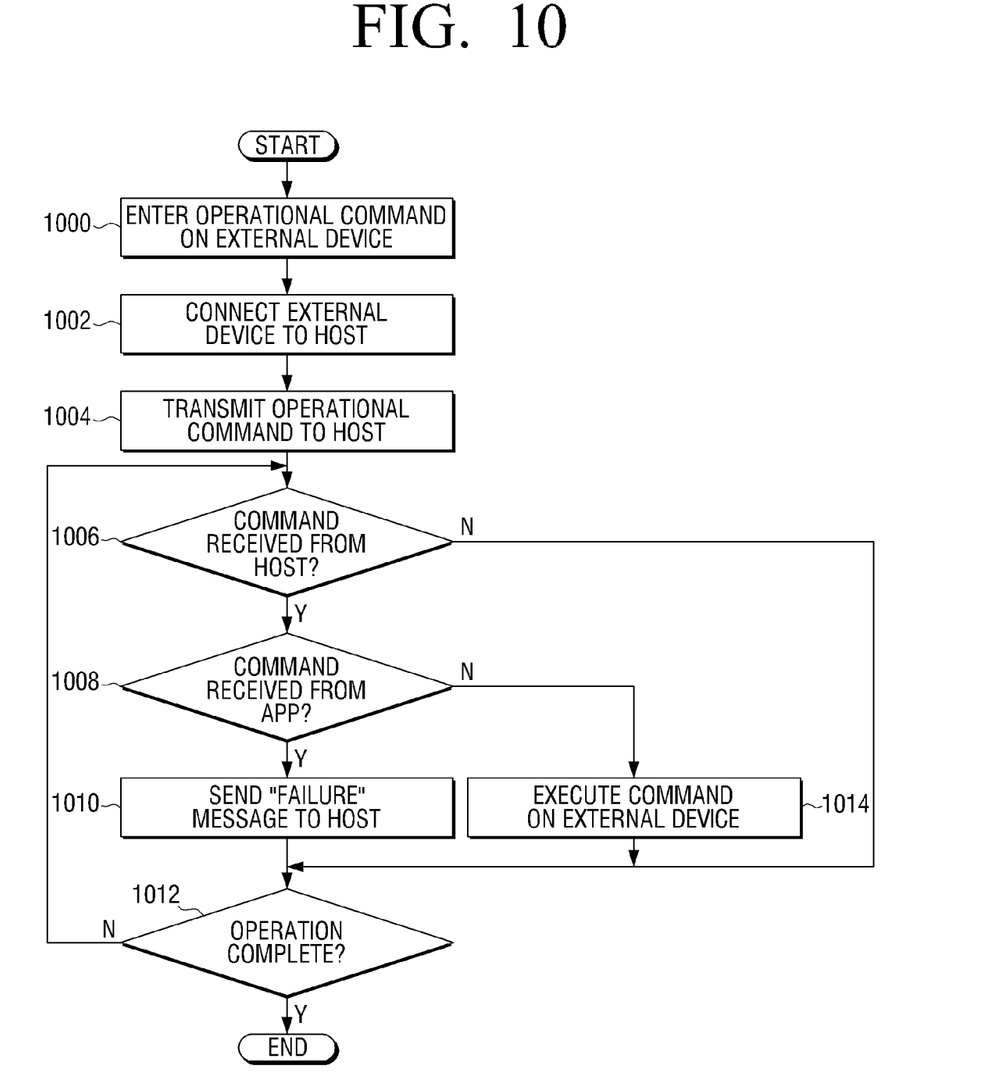
FIG. 10 is a flowchart illustrating operation of an external device connected to a host device according to an embodiment of the present general inventive concept.

FIGS. 9 and 10 are flowcharts illustrating operation of a computing unit or host device and an external device, respectively. In FIG. 9, an external device 900 is connected to the host device, computing unit, or computing device. The host device detects whether an operational command is received from the external device in operation 902. If the host device detects an operational command, the host device executes the operation corresponding to the operational command in operation 904. The operation may include transmitting data, such as video, from the external device to the Internet, as described above, or it may include any other operation. If no operational command is detected from the external device, the host device may transmit a control command to the external device in operation 906. The control command may include a request for stored data, a command to perform a function of the external device, or any other control command.

The host device may transmit a control command before completing the operation of step 904. For example, the operating system of the host device may transmit a command to allow the host device to communicate with external device.

Referring to FIG. 10, an operational command may be entered into an external device in operation 1000, and the external device may be connected to the host in operation 1002. The operational command may be entered at any point prior to connecting with the host, or it may be entered as the external device is being connected to the host. Alternatively, the operational command may be entered after the external device is connected to the host.

Upon connecting to the host, the external device may automatically transmit the operational command to the host 1004 to cause the host to perform the operation. The external device may detect whether a command is received from the host in operation 1006. If no command has been received, the external device waits for either a command from the host or a confirmation that the operation is complete.

If a command is received from the host, the external device determines whether the command is from the application or the OS on the host in operation 1008. If the command is from the OS, the external device executes the command in operation 1014. If the command is from the application, the external device sends an error message, or a failure message, to the host in operation 1010, which may inform the host that another process is being performed by the external device.

The external device may repeat the process until the operation on the host is complete in operation 1012. For example, the host may send a message to the external device confirming that the process has been performed.

The CSW on which the SCSI command processing result is recorded is a kind of message containing information on status of an electronic device. Accordingly, the CSW may be replaced with any message capable of containing the information on the status of the electronic device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, it is possible for a user to input an operation command using an electronic device even when the electronic device is connected to a host device. Therefore, it is possible for the user to command the host device to perform a frequently used function through a simple operation of the electronic device, without the need to be aware of the complex usage of an application.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method by which an electronic device communicates with a host device, the method comprising:
   determining whether a user's command to perform an operation of the host device is input when the electronic device is being connected to the host device, the operation comprising reading content stored in the electronic device and uploading the read content onto the Internet;
   determining whether a host's command is received from the host device if it is determined that the user's command is input; and
   transmitting information to the host device to notify the host device of the user's command if it is determined that the host's command is received, wherein the host's command indicates being generated by an internal application or an operating system.

2. The method according to claim 1, wherein the transmitting of the information to the host device to notify the host device of the user's command comprises not performing a function specified by the host's command if it is determined that the host's command is received.

3. The method according to claim 1, wherein the transmitting of the information to the host device to notify the host device of the user's command comprises:
   transmitting to the host a message stating that a function specified by the host's command is not performed if it is determined that the host's command is received; and
   transmitting information to the host device corresponding to the user's command if an inquiry is received from the host device corresponding to non-performance of the function specified by the host's command.

4. The method according to claim 1, wherein the electronic device is operated according to a bulk-only transport specification.

5. The method according to claim 1, wherein a function specified by the host's command is performed by the host device, and the host's command is generated by software used to manage the electronic device.

6. The method according to claim 1, wherein the transmitting of the information to notify of the user's command comprises transmitting the information to notify the host device of the user's command, not performing a function specified by the host's command even when the electronic device is capable of performing the function, if it is determined that the host's command is received.

7. The method according to claim 1, wherein the user's command is input by pressing a button included on the electronic device, and
the information to notify of the user's command is information to notify of the button pressed by a user.

8. An electronic device comprising:
a communication interface that is communicably connected to a host device;
an operating unit to receive input of a user's command to perform an operation of the host device, the operation comprising reading content stored in the electronic device and uploading the read content onto the Internet; and
a controller to transmit information to notify the host device of the user's command via the communication interface if a host's command is received from the host device via the communication interface after the user's command is received through the operating unit when the electronic device is first connected to the host device via the communication interface, wherein the host's command indicates being generated by an internal application or an operating system.

9. A method by which a host device communicates with an electronic device, the method comprising:
transmitting a host's command to the electronic device connected to the host device; and
performing an operation of the host device specified by a user's command input through the electronic device, if the user's command is received from the electronic device after transmitting the host's command, the operation comprising reading content stored in the electronic device and uploading the read content onto the Internet, wherein the host's command indicates being generated by an internal application or an operating system.

10. A method of communicating with a computing device, the method comprising:
connecting an external storage unit to a computing device;
detecting whether an operation key of the external storage unit is pressed when the external storage unit is connected to the computing device;
automatically performing on the computing device an operation indicated by the operation key on the external storage device
detecting a command from the computing device to the external storage unit; and
if the operation indicated by the operation key is not completed, transmitting a "failure" message to the computing device corresponding to the command from the computing device.

11. The method according to claim 10, further comprising:
after transmitting the "failure" message, completing the operation indicated by the operation key; and
after completing the operation indicated by the operation key, executing the command from the computing device on the external storage unit.

12. A method of performing an operation on a computing device, the method comprising:
controlling an external device to transmit an operation command;
connecting the external device to a computing device;
automatically performing an operation on the computing device corresponding to the operation command;
detecting a command from the computing device; and
if the operation indicated by the operation command of the external storage device is not completed, transmitting a "failure" message to the computing device corresponding to the command from the computing device.

13. The method according to claim 12, wherein:
the computing device comprises an operating system and an application to operate the external device, and
the method further comprises transmitting the "failure" message to the computing device only if the command from the computing device corresponds to the application to operate the external device.

14. The method according to claim 13, further comprising:
executing the command from the computing device before completing the operation indicated by the operation command of the external device when the command from the computing device is from the operating system.

* * * * *